USOO5315639A

United States Patent [19]
Lassers

[11] Patent Number: 5,315,639
[45] Date of Patent: May 24, 1994

[54] HANDS-FREE INTERCOM SYSTEM

[76] Inventor: Arthur H. Lassers, 343 Lamon Ave., Wilmette, Ill. 60091

[21] Appl. No.: 817,136

[22] Filed: Jan. 6, 1992

[51] Int. Cl.[5] ..................... H04M 11/00; H04M 9/00; H04M 1/60; H04H 1/00
[52] U.S. Cl. .......................................... 379/66; 379/64; 379/167; 379/420; 455/3.3
[58] Field of Search ..................... 379/58, 66, 64, 420, 379/432, 167; 455/3.3; 340/310 A, 310 R, 310 CR

[56] References Cited

U.S. PATENT DOCUMENTS

| 4,715,060 | 12/1987 | Lipscher et al. | 379/70 |
| 5,008,954 | 4/1991 | Oppendahl | 455/89 |
| 5,125,026 | 6/1992 | Holcombe | 379/64 |
| 5,148,468 | 9/1992 | Marrick et al. | 379/56 |

Primary Examiner—Stephen Chin
Assistant Examiner—Vijay Shankar
Attorney, Agent, or Firm—James W. Clement

[57] ABSTRACT

A "wireless" door answering intercom system (meaning no special wiring between the inside and outside stations) that allows a visitor to carry on a two-way conversation with a person inside the building without requiring the visitor to manipulate a "push-to-talk" button. The transmitter and receiver at the outside door are on all the time, powered by connections to the existing A.C. power system in the building. The outside transmitter and receiver operate on separate carrier frequencies or frequency bands, the receiver on Channel 1 and the transmitter on Channel 2. The inside answering station includes a transmitter on Channel 1 and a receiver on Channel 2. The inside station has a spring loaded "push-to-talk" switch. This switch is normally biased to connect the inside answering station speaker/microphone to the output of the Channel 2 receiver, so that anything said at the outside door station can be heard at the inside answering station. When the "push-to-talk" switch is pushed, it connects the inside loudspeaker to the Channel 1 transmitter, and the speaker functions as a microphone, so that whatever is said at the inside answering station is heard at the outside door station.

12 Claims, 5 Drawing Sheets

HANDS-FREE INTERCOM SYSTEM

This invention relates to a wireless intercommunication system, and more particularly to such a system that has a calling station that does not require the caller to manipulate a "push-to-talk" switch.

APPLICABILITY OF THE INVENTION

The intercom system of this invention has a variety of commercial, industrial and residential applications where (1) special intercom wiring between stations would be a problem, (2) voice activated switching ("VOX") would not be practical and (3) it is necessary or advantageous for the calling party to carry on the two-way conversation "hands free." However, the most common application of this system is for residential door answering.

For this latter reason, the present invention is for simplicity described and illustrated in this application as a wireless door answering system, and all references in the specification to the basic invention are to the "outside door station," which is the calling station in a door answering system, and to the "inside door answering station," which is the answering station in such a system. The attached claims are nevertheless intended to include any intercom system of the kind described in this application that is capable of "hands-free" operation at a predetermined calling station and is used between any two stations—regardless of whether they are located inside or outside of a building—that are both located adjacent to an outlet of a conventional A.C. power line that provides electrical power at a standard frequency.

In the case of the door answering intercom system that is described in detail herein, the outside door station is the "predetermined calling station" at which the caller does not need to manipulate a "push-to-talk" button in order to use the system.

BACKGROUND OF THE INVENTION

In contrast to the "wireless" intercom system of the present invention, door answering intercom systems currently in use that do not require the visitor to manipulate a push-to-talk button at the outside door station are all of the "wired" type. In other words, special wires must be run between each inside answering station and the outside door station to carry the necessary audio electrical signals back and forth between the outside and the inside stations.

Such a system, with its special wiring, can be easily installed in a building that is under construction. However, it is much more difficult to install the necessary wiring of this type running from the outside door calling station to the inside door answering station (or stations) in existing buildings. This wiring problem is especially troublesome for the "do-it-yourselfer."

"Wireless" intercommunication systems that utilize the basic electrical wiring of a building to transmit a radio frequency signal within the building—producing what is called "carrier current transmission"—are very well known. Wireless intercom systems of the AM or amplitude modulation type have been available for a great many years. See, for example, the U.S. Pat. Nos. to Benson 1,840,013 issued in 1932, Parker 2,221,994 issued in 1940, Roy 2,883,459 issued in 1959 and Liberman 2,887,533 also issued in 1959. Wireless intercom systems of the FM or frequency modulation type have also been known for a number of years. See, for example, U.S. Pat. No. 4,701,945 issued to Pedigo in 1987 on an application filed in 1984.

However, all wireless intercom models presently known are either (1) of the "VOX" (voice activated switching) type or (2) of the type that requires the person at each station to push the "talk" button to talk, then release it to listen. With the first type, the user's voice puts the radio unit in its transmitting condition. With the second type, pushing the "talk" button switches the radio unit from its receiving to its transmitting condition, and releasing the button does the reverse.

The "VOX" systems are not suitable for door answering intercoms since other sounds beside voice, such as street traffic noises, will switch the "VOX" units to "send." Furthermore, if both parties speak at once both stations will switch to the "send" or "transmit" mode, and then neither party will hear the other.

The pushing of buttons is acceptable for office intercoms or even for room-to-room household intercoms, where all users can be made to know and understand the "push-to-talk/release-to-listen" system. However, it is not practical for door answering systems, since a visitor to a home or other building who is standing at the outside door does not know that he must push the "push-to-talk" button after he rings the door bell. Signs and plaques at the door with instructions, or verbal instructions over the intercom, are cumbersome, and make known types of wireless intercom systems unsalable for door answering use.

SUMMARY OF THE INVENTION

This invention provides a system for voice communication between stations each of which is connected to a separate outlet of a given A.C. power line of conventional type, which system (1) allows the party at a predetermined calling station to carry on a two-way conversation with the called party, (2) does not require the calling party at the predetermined station to manipulate a push-to-talk button as the person at the answering station must do, and (3) does not require wiring (other than the A.C. power line) between the predetermined calling station and any number of stations capable of answering and talking to the calling station. This system is very useful, as already indicated, as a residential door answering system.

In a door answering intercom system according to the present invention, the outside door station includes a radio receiver such as, for example, the receiver modules (preferably FM) commonly found in known wireless intercoms. The output leads of this receiver are operatively connected to a loudspeaker. It operates on a first predetermined carrier frequency or frequency band as a part of a first channel for transmission of sound from the inside door answering station to the outside door station. This channel is designated the first channel because it is the first channel used (by the person at the inside door answering station) after the door bell has been rung (by the person at the outside door). The receiver being described, located at the outside door station, is powered by connection with a nearby outlet of the building A.C. power line, and is on all the time.

The outside door station also includes a radio frequency transmitter module such as, for example, the transmitters now in use in known wireless intercoms. The input leads of the transmitter are operatively connected to a microphone, or to a speaker used as a microphone. It operates on a second, separate, predetermined carrier frequency or frequency band. Like the receiver at the outside door calling station, this transmitter is powered by connection with a nearby power line outlet and is on all the time, but it does not interfere with the receiver because the two units operate on different frequencies.

Since both the transmitting and receiving units are on all the time, there is no need for any button pushing or switching in order to go from the "talk" to the "listen" condition at the outside door calling station. In a door answering system, it is therefore the outside station that is the predetermined calling station that can be operated "hands-free."

The inside door answering station includes a transmitter that operates on the same first predetermined carrier frequency or frequency band as the receiver at the outside door calling station. The inside answering station also includes a receiver that operates on the second, separate, predetermined carrier frequency or frequency band on which the transmitter at the outside door calling station operates.

Both the transmitter and the receiver at the inside door answering station, like the receiver and transmitter at the outside door calling station, are powered by connection with a nearby outlet of the building A.C. power line. It is this connection of all four modules of the system (a receiver and a transmitter at both the calling and the answering stations) with the building power line that makes the carrier current transmission of this invention possible. Because this system relies solely on the building's power wiring and requires no additional, special wiring, it is referred to in this specification and in the attached claims as a "wireless" intercommunication system.

In one preferred embodiment, the inside door answering station has an A.C. line switch, and a spring loaded "push-to-talk" switch that is normally biased to the listen position. In this normal biased condition, the "push-to-talk" switch connects a speaker to a receiver for the second channel, both at the inside station. As a result, when the A.C. line switch is turned on, any person at the inside door answering station hears everything that is said at the outside door calling station.

On the other hand, when the "push-to-talk" switch at the inside door answering station is moved to the "talk" position, the switch connects the speaker to the transmitter for the first channel, and the speaker functions as a microphone. In this mode, everything said at the inside door answering station is heard at the outside door calling station by means of the latter station's receiver and associated speaker.

Other embodiments of the invention are also disclosed.

ADVANTAGES OF THE INVENTION

As indicated above, the intercommunication system of the present invention is characterized as "wireless," since no special wiring is needed. The only wiring needed is a line cord for plugging in to the A.C. power line outlet at each station. This avoids the need for anything except a power line outlet at each of the stations.

When used as a door answering system, the system requires no button pushing on the part of a visitor at the outside door calling station after the initial push of the door bell button. Once a visitor rings the door bell, all switching can done at the inside door answering station, and the visitor talks and listens "hands-free."

With this system, any number of answering stations can be plugged in anywhere in the house or other building. If desired, any of these inside answering stations can be moved from place to place at will, limited only by the location of the building's various standard electrical outlets.

GENERAL DESCRIPTION OF DRAWINGS

The invention will now be described by reference to the accompanying drawings, in which.

DETAILED DESCRIPTION OF PREFERRED EMBODIMENTS

First Embodiment Of Door Answering System Of This Invention

Figure 1:
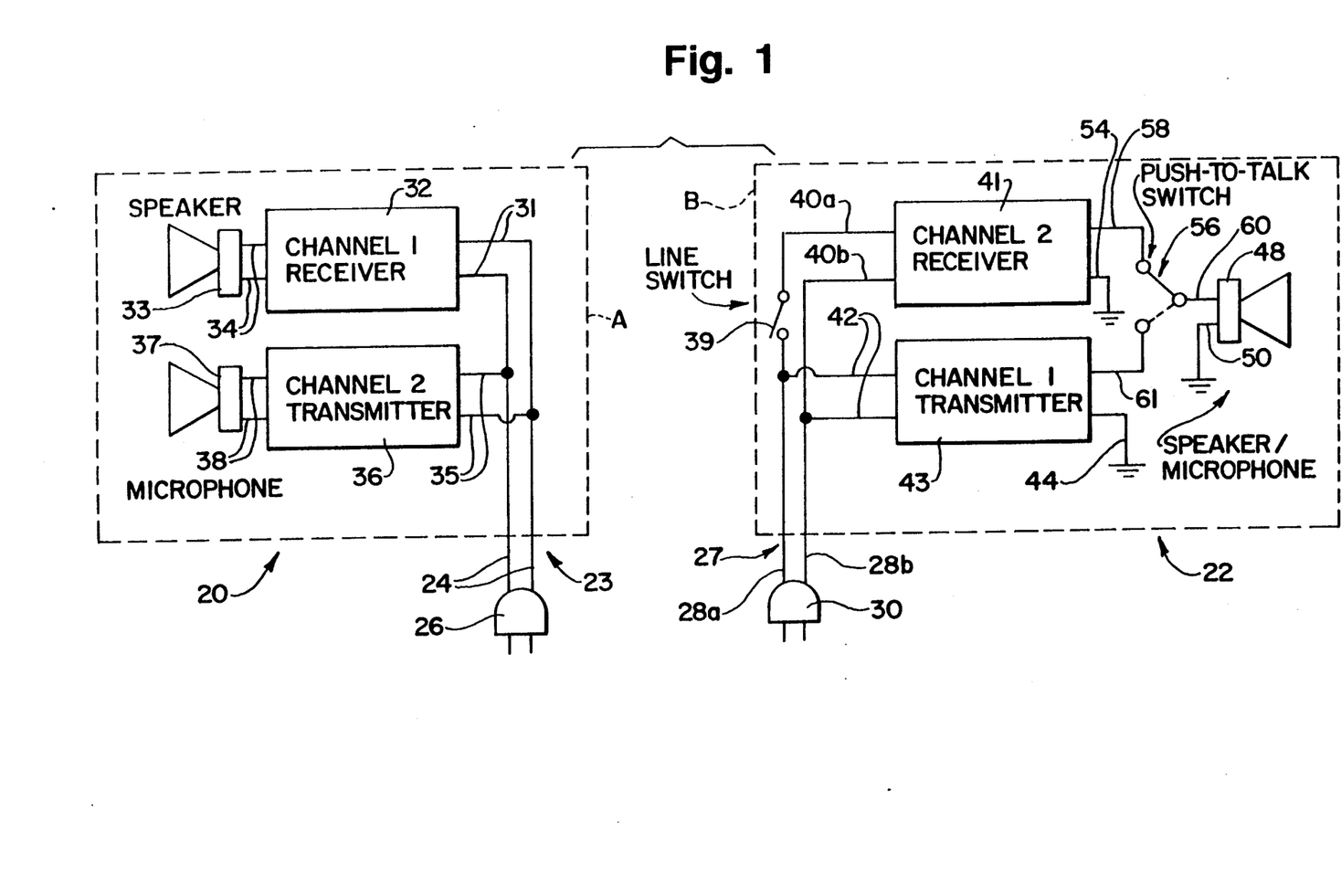
FIG. 1 is a block diagram of a wireless door answering intercom system according to the present invention which includes an outside door calling station and an inside door answering station, with a separate line switch and "push-to-talk" switch at the inside answering station.

FIG. 1 of the drawing is a block diagram of one embodiment of a wireless door answering intercommunication system according to this invention. The system can be used for a home, office building or other building that has a door bell or other signal system for use by visitors to the building located adjacent to an exterior door leading into the building. The building has an electrical power system that provides standard electrical power at a plurality of outlets. One of these outlets is located in the vicinity of the exterior door, and one in the vicinity of an answering station in the interior of the building.

FIG. 1 shows an outside door calling station 20 on the left-hand side of the Figure, and an inside door answering station 22 on the right-hand side of the Figure. Alternating electrical current at a standard commercial frequency—usually 60 Hz in the United States and Canada, and 50 Hz in many other countries—is supplied to outside door station 20 through line cord 23 when the cord is plugged into the electrical outlet near the exterior door. Line cord 23 thus comprises means for delivering alternating current at a standard frequency to the outside door calling station from the building power line. This line cord is comprised of a pair of wires 24 and plug 26.

Similarly, power is supplied to inside door answering station 22 through line cord 27 (which is comprised of a pair of wires 28a and 28b and plug 30) when the cord plug is inserted in the outlet near the inside door answering station.

Input leads 31 of radio frequency receiver 32 are connected across pair of wires 24 of line cord 23. This receiver operates on a first predetermined carrier frequency or frequency band—for an FM unit, suitably about 200 kHz—as a part of a first sound transmitting channel, so designated (as explained above) because it is the first channel used after the door bell has been rung. The receiver may be a receiver module (preferably FM) such as is commonly found in known wireless intercom systems. Speaker 33 is operatively connected to output leads 34 of Channel 1 receiver 32.

Output leads 35 of radio frequency transmitter 36 are also connected across pair of wires 24 of line cord 23. This transmitter operates on a second, separate, predetermined carrier frequency or frequency band—for an FM unit, suitably about 225 kHz—as a part of a second sound transmitting channel. Again, this transmitter may be a transmitter module like the transmitter now in use in known wireless intercom systems. Microphone 37 is operatively connected to input leads 38 of Channel 2 transmitter 36. If desired, microphone 37 may be a conventional small loudspeaker that is used as a microphone.

As will be seen, when plug 26 is inserted in the outlet of the electrical power system of the building that is adjacent to the exterior door, receiver 32 for the first channel and transmitter 36 for the second channel will be on all the time. Consequently, there is no need for any button pushing or switching or other manipulation in order to go from the "talk" condition to the "listen" condition, and back again to the "talk" condition, at the outside door station—which is the predetermined calling station that is adapted to be operated "hands-free."

Although both the receiver and the transmitter at this predetermined calling station are on all the time, the transmitter will not interfere with the receiver because they operate on two separate carrier frequencies or frequency bands.

At inside door answering station 22, wire 28a of line cord 27 is connected in the embodiment being described to one side of line switch 39, which is a single-pole single-throw switch that is connected on its other side to first input lead 40a of radio frequency receiver 41 for the second channel. This switch may be actuated by the user of the system to turn inside door answering station 22 on or off as desired, as the circuit through pair of electrical power wires 28a and 28b is completed or opened, respectively. Second input lead 40b of Channel 2 receiver 41 is connected at all times to wire 28b of line cord 27.

As will be seen, line cord 27 and line switch 39 comprise means for delivering alternating electrical current at a standard frequency to inside door answering station 22 from the outlet in the vicinity of the answering station. If line switch 39 or the equivalent is not included in the system, all sounds at the exterior door will be heard at all times at the inside door answering station. The line switch will usually be left open, until it is closed to activate the system when the door bell is heard. Or, if desired, it can be kept closed if for any reason the sounds at the exterior door need to be monitored continuously.

Output leads 42 of radio frequency transmitter 43 are connected across pair of wires 28a and 28b of line cord 27. This transmitter operates on the first predetermined carrier frequency or frequency band on which the above described receiver 32 for the first channel operates. The transmitter is therefore a part of the first sound transmitting channel. Input lead 44 of Channel 1 transmitter 43 is connected to ground.

(It should be understood that whenever reference is made in this specification or the attached claims to a connection to ground, this includes a connection to any suitable conductor that is utilized as a common return.)

Speaker/microphone 48 is adapted to operate, in a manner that is common in the art of intercommunications systems, either as a loudspeaker (when Channel 2 is operative) or as a microphone (when Channel 1 is operative). First lead 50 of speaker/microphone 48 is connected to ground.

Radio frequency receiver 41 operates on the second, separate, predetermined carrier frequency or frequency band on which transmitter 36 at outside door calling station 20 operates. It is thus a part of the second sound transmitting channel, designated as "Channel 2" in the drawing. Output lead 54 of Channel 2 receiver 41 is connected to ground.

"Push-to-talk" switch or talk/listen selection means 56 of the embodiment being described is a single-pole double-throw switch. It is normally biased (as, for example, by spring loading) to connect second output lead 58 of Channel 2 receiver 41 to second lead 60 of component 48 operating as a speaker. Switch 56 is also adapted, when selectively actuated by the user of the system at inside door answering station 22, to connect second input lead 61 of Channel 1 transmitter 43 to lead 60 of component 48 operating as a microphone.

Channel 1 receiver 32 and Channel 2 transmitter 36 are always on when plug 26 is inserted in an electrical power outlet. It follows that when line switch 39 at inside door answering station 22 is closed, any sound picked up by microphone 37 at outside door calling station 20 will be converted by that microphone into an electrical signal in the audio frequency range, which is then converted by transmitter 36 into a radio frequency electrical signal that is carried by the electrical power wiring system of the building to inside door answering station 22. The radio frequency signal is then converted at station 22, by receiver 41 for the second channel and by speaker 48, into an audible sound.

Thus, through the "carrier current transmission" just described, as soon as A.C. line switch 39 is closed (usually by the person inside the building who has heard the door bell and has gone to inside door answering station 22), anyone at the inside door answering station 22 hears everything that is said at outside door calling station 20.

The reverse is true when line switch 39 is closed and push-to-talk switch 56 is actuated by the user at inside door answering station 22 to connect component 48 operating as a microphone to input lead 61 of Channel 1 transmitter 43. In this mode, whatever is said at inside answering station 22 will be heard at outside station 20 through the action of microphone 48, Channel 1 transmitter 43, Channel 1 receiver 32 and speaker 33.

As shown in FIG. 1, the various components that comprise outside door calling station 20 and inside door answering station 22 may suitably be enclosed in housing A and in housing B, respectively.

Second Embodiment Of Door Answering System Of This Invention

Figure 2:
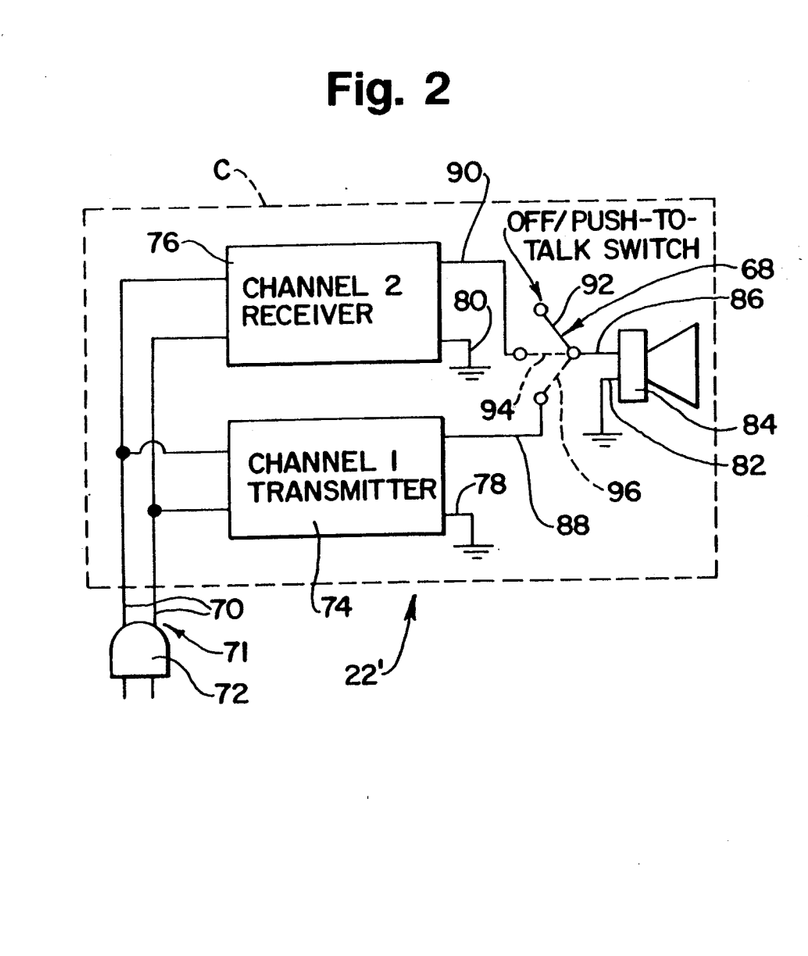
FIG. 2 is a block diagram of an inside door answering station in which an "off/push-to-talk" switch is employed, which station can be substituted for the inside door answering station of FIG. 1.

FIG. 2 is a block diagram of a second, preferred embodiment of the inside answering station of a wireless door answering intercommunication system according to this invention. Outside door calling station 20 is not shown in FIG. 2.

In this embodiment, the line switch that in FIG. 1 is located in wire 28a of line cord 27 (in the right-hand portion of that Figure) is combined at inside door answering station 22' with a "push-to-talk" switch to form "off/push-to-talk" switch or talk/listen selection means 68.

Pair of wires 70 in line cord 71 at door answering station 22' transmits alternating electrical current through plug 72 from the electrical power system of the building to Channel 1 transmitter 74 and Channel 2 receiver 76. First input lead 78 of Channel 1 transmitter 74, first output lead 80 of Channel 2 receiver 76 and first lead 82 of speaker/microphone 84 are all connected to ground.

Second lead 86 of speaker/microphone 84 is selectively connected to second input lead 88 of Channel 1 transmitter 74, or to second output lead 90 of Channel 2 receiver 76, through "off/push-to-talk" switch 68. This switch has a first, off position 92 in which the switch is open. Switch 68 is selectively movable to this off position by the person at the inside door answering station. In this position of the switch, the return circuit for the current-delivering means for the inside door answering station is open.

Switch 68 has a second position 94 to which the switch is normally biased when it has not been placed by the person at the inside door answering station in off position 92. In the embodiment of FIG. 2, the biasing of switch 68 is produced by spring loading in a conventional manner. In position 94, switch 68 connects second lead 86 of component 84 operating as a speaker to second output lead 90 of Channel 2 receiver 76.

Switch 68 has a third position 96 to which the user of the system can selectively push the switch. In this position of switch 68, second lead 86 of component 84 operating as a microphone is connected to second input lead 88 of Channel 1 transmitter 74.

"Off/push-to-talk" switch 68 can be a conventional three-position rotary or wafer switch.

When switch 68 is in its third position and the handle of the switch is released, the spring loading snaps the switch back to its second position. The person at the inside door answering station then hears whatever the person at the outside door says into microphone 37 at outside door calling station 20. When the conversation is finished, the person inside the building manually moves the switch handle to place switch 68 in its first, off position, unless for some reason he or she wishes to continue to overhear whatever is happening outside the door.

As shown in FIG. 2, the various components that comprise inside door answering station 22 may suitably be enclosed in housing C.

Figure 3:
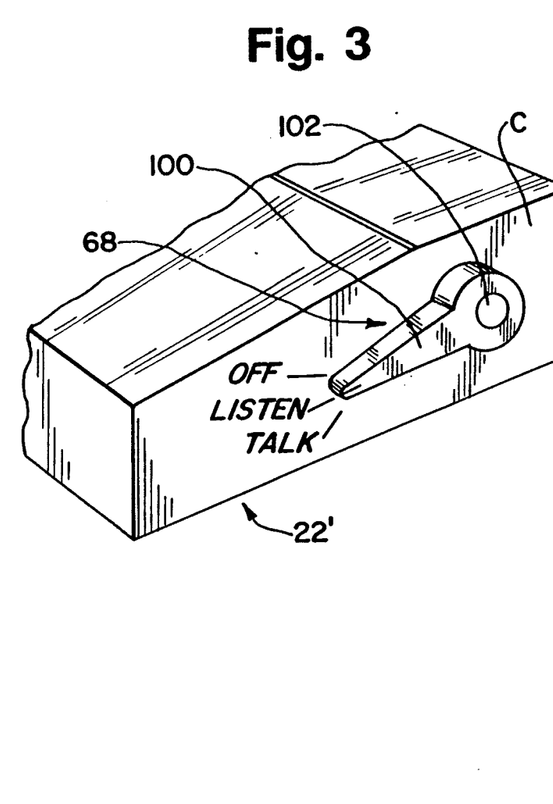
FIG. 3 is a fragmentary perspective view of a portion of the housing for the components that comprise the inside door answering station of FIG. 2, showing the handle of the "off/push-to-talk" switch that is used at that station.

FIG. 3 is a fragmentary perspective view of a portion of housing C in which inside door answering station 22' is housed, showing handle 100 of lever-operated "off-/push-to-talk" switch 68. As will be understood, handle 100 is rotatable by the user of the system about pin 102. The three positions 92, 94 and 96 of switch 68 that have been described above are indicated by conventional marks and labels.

In FIG. 3, handle 100 is in the second, spring-biased position 94 to which it has been moved from the off position by the user of the system. When the person at inside door answering station 22' wishes to talk to the person standing at outside door calling station 20, he depresses handle 100 and thereby moves the switch into its third position 96 shown in FIG. 2.

First Combination Door Answering and Internal Communication System

Figure 4:
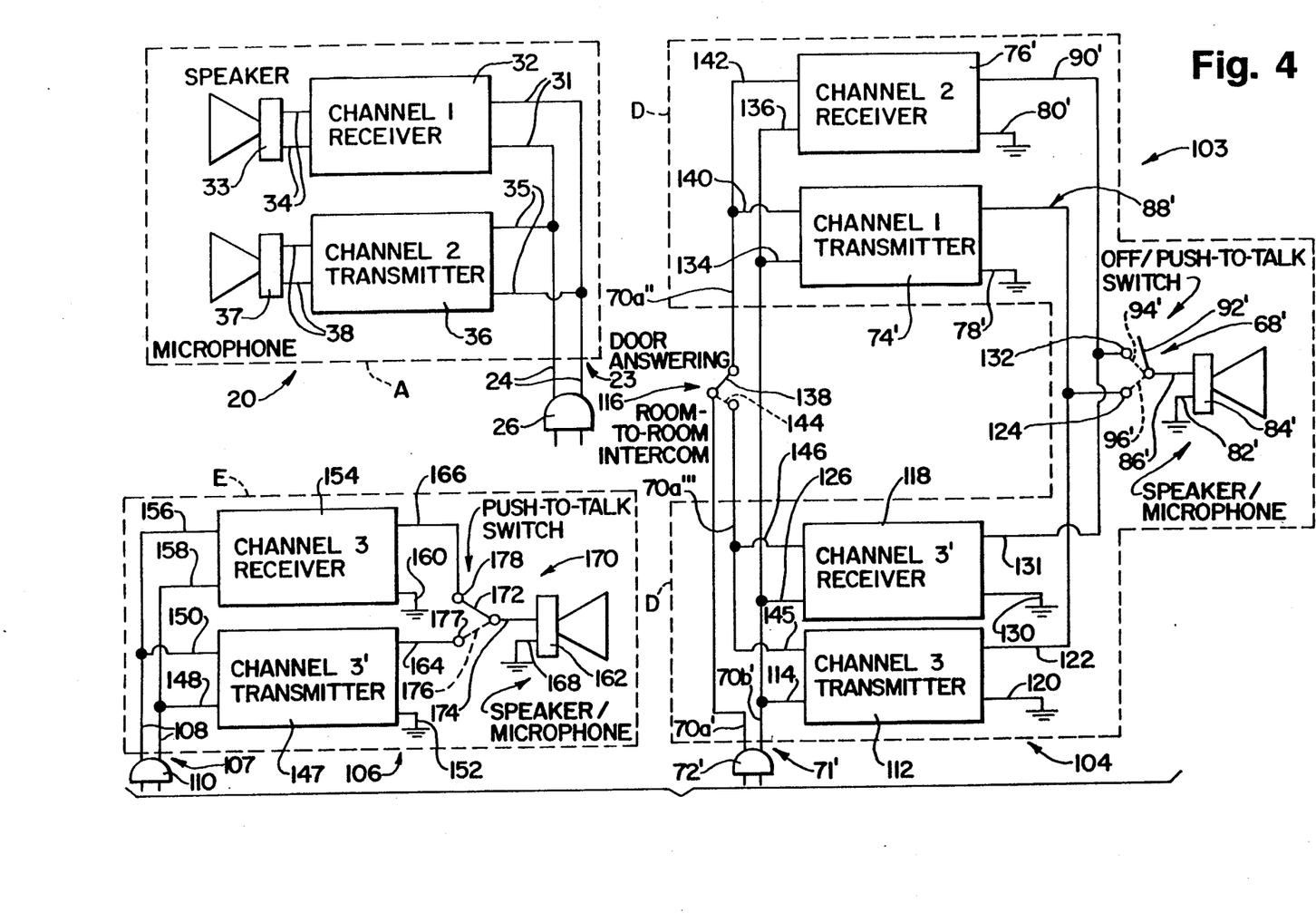
FIG. 4 is a block diagram of an embodiment of a wireless door answering intercom system according to the present invention in combination with an auxiliary, room-to-room wireless intercom system.

FIG. 4 is a block diagram of an embodiment of a wireless door answering intercommunication system according to this invention which includes an internal room-to-room intercommunication system as an auxiliary system in combination with the door answering system.

The upper left-hand portion of FIG. 4 shows outside door calling station 20, which is powered, as in the embodiments previously described, through line cord 23. The right-hand portion of FIG. 4 shows inside door answering station 103 and first internal intercommunication station 104. (As indicated, the components that comprise these two stations may suitably be enclosed in housing D.) The lower left-hand portion of the Figure shows second internal intercommunication station 106, which is at a location removed from the location of stations 103 and 104. (As indicated, the components that comprise this station may suitably be enclosed in housing E.)

Electrical power for inside door answering station 103 and first room-to-room intercommunication station 104 is provided by line cord 71' (which is comprised of pair of wires 70a' and 70b' and plug 72'), when the plug is inserted in an outlet for the electrical power system of the building. Electrical power is provided at second internal intercommunication station 106 by line cord 107 (comprised of pair of wires 108 and plug 110), when the plug is inserted in one of the building's electrical power outlets.

First auxiliary intercommunication station 104 includes radio frequency transmitter 112, whose output lead 114 is connected at all times to wire 70b' of line cord 71'.

System selection means 116 is a single-pole double-throw switch that is adapted to connect wire 70a' of line cord 71' in FIG. 4 either with inside door answering station 103 or with first internal intercommunication station 104, depending upon which position of the switch is selected by the person at the inside door answering station. Specifically, this switch is adapted to connect wire 70a' either (1) to Channel 2 receiver 76' and Channel 1 transmitter 74' (through wire 70a") for inside door answering station 103, on the one hand, or (2) to receiver 118 and transmitter 112 (through wire 70a''') for first room-to-room intercommunication station 104, on the other.

Switch 116 is shown diagrammatically in FIG. 4 as being located outside housing D, but the operative portion of the switch itself may of course be within the housing, with only the switch handle extending outside.

Radio frequency transmitter 112 operates on a third, separate, predetermined carrier frequency or frequency band—for an FM unit, suitably about 250 kHz—as a part of a third sound transmitting channel. Transmitter 112 (designated Channel 3 transmitter in FIG. 4) has a first input lead 120 connected to ground. Its other input lead 122 is connected to contact 124 of "off/push-to-talk" switch 68', which leads to speaker/microphone 84' when the switch is in its third position 96', having been pushed and held there by the person at the inside door answering station. As will be seen, switch 68' operates as a talk/listen selection means.

Radio frequency receiver 118 has its input lead 126 connected at all times to wire 70b' of line cord 71' in the same way output lead 114 of transmitter 112 is connected. Receiver 118 operates on the same third, separate, predetermined carrier frequency or frequency band as does transmitter 112. However, as will be explained below, this receiver is never operative at the same time as Channel 3 transmitter 112, and thus it is designated as the Channel 3' receiver.

Receiver 118 and transmitter 112, together with the transmitter and receiver that operate on the third carrier frequency or frequency band at a room-to-room intercom station located elsewhere in the building, may be considered as comprising Channel 3/3'.

First output lead 130 of Channel 3' receiver 118 is connected to ground. Second output lead 131 of this receiver is connected to contact 132 of "off/push-to-talk" switch 68', which leads to speaker/microphone 84' when the switch is in its second position 94'.

As will be seen, wire 70b' of line cord 71' is connected at all times with output lead 134 of Channel 1 transmitter 74', and with input lead 136 of Channel 2 receiver 76', at inside door answering station 103. When the relevant power circuit is closed by placing line switch 116 in position 138, electrical power is supplied to inside door answering station 103. At this time, output lead 140 of Channel 1 transmitter 74' and input lead 142 of Channel 2 receiver 76' are connected (through line 70a") to wire 70a' of line cord 71'. In this mode, the door answering intercommunication system is operative, and the auxiliary room-to-room intercommunication system is turned off.

When the person at the inside door answering station moves line switch 116 into position 144, the circuit just described is opened and electrical power is supplied instead to internal intercommunication station 104. At this time, output lead 145 of Channel 3 transmitter 112 and input lead 146 of Channel 3' receiver 118 are connected (through line 70a''') to wire 70a' of line cord 71'.

The person at the inside door answering station selects one or the other position of switch 116 to determine whether A.C. power will be delivered to inside door answering station 103, or to first internal intercommunication station 104 as a part of an auxiliary intercommunication system. In either case, the user then employs "off/push-to-talk" switch 68' either to keep the selected station off, or to place it in its "listen" mode, or to place it in its "talk" mode, as desired.

When the auxiliary, room-to-room intercommunication system is operative because system selection means 116 is in its room-to-room intercom position, the person at combination stations 103 and 104 will elect to listen, by leaving switch 68' in the listen position to which it is normally biased, or will depress the "push-to-talk" switch and proceed to talk. When switch 68' is in its listen position, only receiver 118 is on, and when it is in its talk position, it is only transmitter 112 that is on. In other words, only one of the modules at this internal intercommunication station 104—either the Channel 3 transmitter or the Channel 3' receiver—will be on at any given time. Thus, despite the fact that transmitter 112 and receiver 118 operate on the same carrier frequency or frequency band—which may be characterized as Channel 3/3'—there will be no interference between them.

Second internal intercommunication station 106 of the auxiliary system illustrated in FIG. 4 is powered by line cord 107, which is comprised of pair of wires 108 and plug 110. The plug is connected to the electrical power line of the building at an outlet in the vicinity of station 106.

Radio frequency transmitter 147 has its output leads 148 and 150 connected across pair of wires 108 of line cord 107. Input lead 152 of transmitter 147 is connected to ground. This transmitter operates on the above mentioned third, separate, predetermined carrier frequency or frequency band, as a part of the third sound transmitting channel.

Radio frequency receiver 154 at second auxiliary intercommunication station 106 operates on the same third, separate, predetermined carrier frequency or frequency band as transmitter 147 does. However, as explained above for transmitter 112 and receiver 118 at the first auxiliary intercommunication station, only one of transmitter 147 and receiver 154 is operative at any given time, and thus there is no interference between them. Because transmitter 147 will ordinarily be operative only when Channel 3' receiver 118 at first internal intercom station 104 is on, it is designated as the Channel 3' transmitter.

Input leads 156 and 158 of Channel 3 receiver 154 are connected across pair of wires 108 of line cord 107. Output lead 160 of receiver 154 is connected to ground.

Speaker/microphone 162 is adapted to operate as a microphone when connected to input lead 164 of Channel 3' transmitter 147, and as a loudspeaker when connected to output lead 166 of Channel 3 receiver 154. First lead 168 of this speaker/microphone is connected to ground.

"Push-to-talk" switch 170 is normally biased, as by spring loading, into its first position 172. In this position, it connects second output lead 166 of Channel 3 receiver 154 through contact 173 to second lead 174 of speaker/microphone 162. When the person at second internal intercommunication station 106 moves "push-to-talk" switch 170 into its second position 176, second input lead 164 of Channel 3' transmitter 147 is connected through contact 177 to second lead 174 of the speaker/microphone.

In this third embodiment of the invention, whenever "off/push-to-talk" switch 68' is in its normal biased or "listen" position 94', speaker/microphone 84' is connected to both Channel 2 receiver 76' at inside door answering station 103 and to Channel 3' receiver 118 at first internal intercommunication station 104. In the same way, whenever switch 68' is in its "talk" position 96', speaker/microphone 84' is connected to both Channel 1 transmitter 74' at inside door answering station 103, and to Channel 3 transmitter 112 at first internal intercommunication station 104. These dual connections save some switching that would otherwise be necessary, and do not cause any interference because in each case line switch 116 allows only one or the other of the two stations—inside door answering station 103 and first internal intercommunication station 104—to be powered at any given time.

It should be noted that with this third embodiment of the invention, the only persons who are required to use a push-to-talk switch are, first, whoever is at the combined inside door answering station and first room-toroom intercommunication station and, second, whoever is at the second room-to-room intercommunication station. The visitor at the outside door is still not required to push any switch to talk. The visitor is required only to press the door bell, and thereafter he or she can listen or talk, as desired, without doing anything further.

The handles for line switch 116 and off/push-to-talk switch 68' are ordinarily located close to each other, within convenient reach of the person inside the building at the combination door answering and internal intercommunication system. That person can select any of the following three standby modes for the combination system:

First, with switch 116 in either of its positions, off-/push-to-talk switch 68' can be placed in its off position. Outside door calling station 20 and second internal intercommunication station 106 will remain on, but inside door answering station 103 and first internal intercommunication station 104 will be off.

Second, with switch 116 in its door answering position 138 and switch 68' in its normal biased listen position 94', the person at the inside door answering station will hear anything said by a visitor at the outside door and can respond after moving switch 68' to its talk position. Because of the position of switch 116, first internal intercommunication station 104 will of course be off.

Third, with switch 116 in its internal intercommunication position 144 and switch 68' in its normal biased listen position 94', the person at combination inside door answering station 103 and first internal intercommunication station 104 will hear anything said at any other internal intercommunication station (such as station 106) whenever the "push-to-talk" switch at the latter station is depressed by the person who is standing at that station. Because of the position of switch 116, inside door answering station 103 will be off.

Second Combination Door Answering And Internal Communication System

Figure 5:
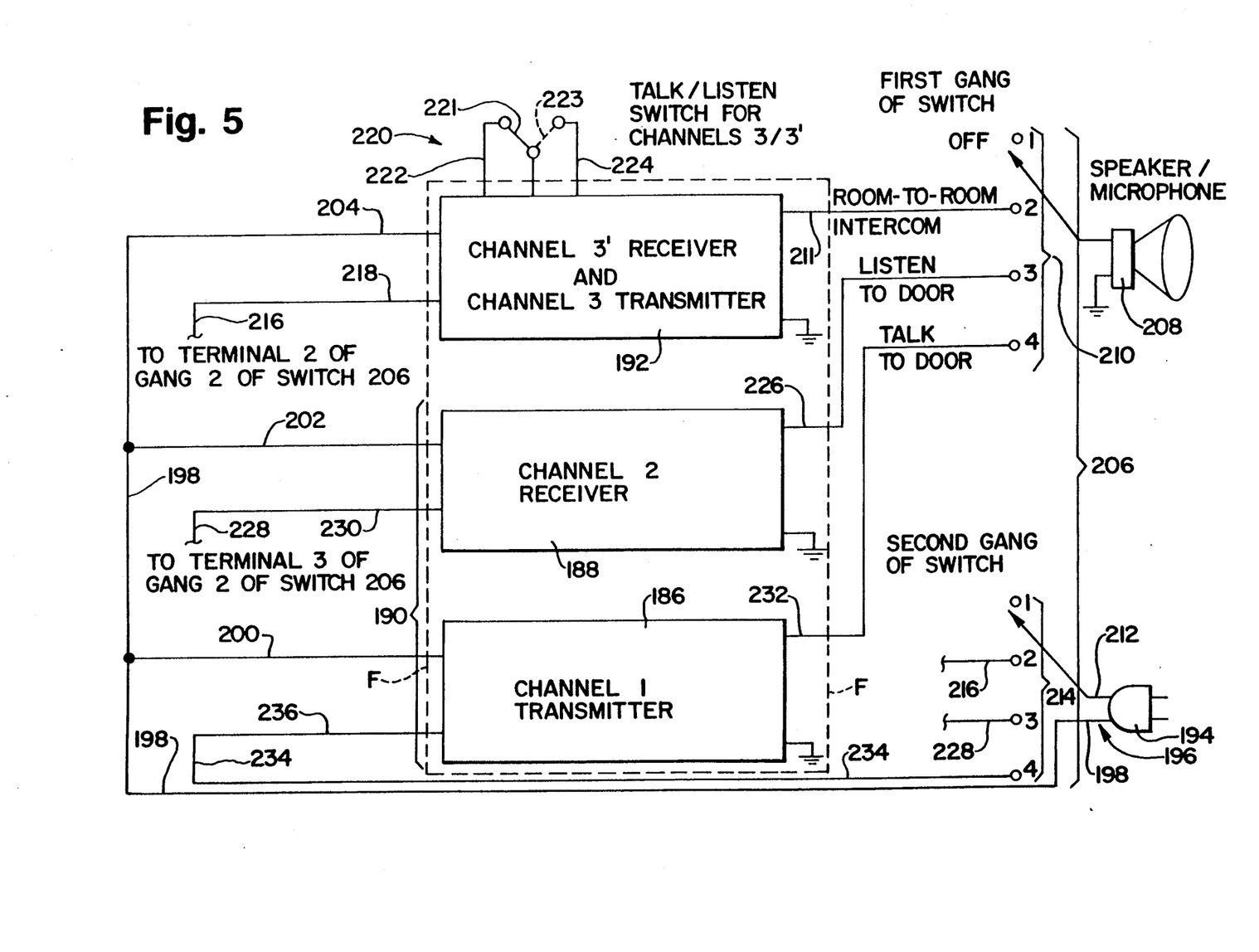
FIG. 5 is a block diagram of a portion of a second embodiment of a combination of a wireless door answering intercom system according to the present invention with an auxiliary, room-to-room wireless intercom system.

FIG. 5 is a block diagram of a portion of a fourth embodiment of a wireless door answering intercommunication system according to this invention which, like the third embodiment described above, includes an auxiliary internal room-to-room intercommunication system in combination with the door answering system.

The portion of this embodiment of the invention that is shown in this block diagram includes Channel 1 transmitter 186 and Channel 2 receiver 188 for inside door answering station 190, and the Channel 3' receiver and Channel 3 transmitter for first internal intercommunication station 192. In the embodiment shown, the two stations 190 and 192 are indicated as being contained in the same housing F.

It will be understood that in its complete form this embodiment of the combination intercommunication system of this invention includes an outside door answering station such as station 20 already described above. It will also be understood that the combination system further includes a second room-to-room intercommunication station such as station 106 described above, or if desired another combination station such as is illustrated in this FIG. 5 and will now be described. In the latter case, any station can answer the door.

As in the embodiment of FIG. 4, the receiver for the first room-to-room intercommunication station is designated as the Channel 3' receiver because it and the transmitter for that station, although operating on the same carrier frequency or frequency band, are never operative at the same time. Also as in that FIG. 4 embodiment, the two pairs of transmitter/receiver modules in the present embodiment that operate on the same carrier frequency or frequency band (at different times) at each of the first and second stations of the room-to-room intercom system may together be considered as comprising Channel 3/3'.

Sound transmitting Channels 1, 2 and 3/3' of this combination system operate on separate carrier frequencies or frequency bands—for FM units, suitably about 200 kHz, 225 kHz and 250 kHz for Channels 1, 2 and 3/3', respectively.

Power for the receivers and transmitters shown diagrammatically in FIG. 5 is made available when plug 194 of line cord 196 is inserted in one of the outlets of the power system of the building where the stations in question are located. The building's wiring that distributes A.C. power is also used, as in the other embodiments of this invention described in this specification, for the wireless "carrier current transmission" that is utilized in this invention.

Wire 198 of line cord 196 is connected in parallel at all times, through leads 200 and 202, respectively, with Channel 1 transmitter 186 and Channel 2 receiver 188. Similarly, wire 198 is connected in parallel at all times, through lead 204, with the Channel 3 transmitter and the Channel 3' receiver.

Switch 206 determines whether Channel 1 transmitter 186 or Channel 2 receiver 188 of inside door answering station 190 is operative at any given time. This switch also determines—together with switch 220 to be described below—whether at any particular time the Channel 3' receiver or the Channel 3 transmitter of first internal intercommunication station 192 is operative. This switch, shown diagrammatically in FIG. 5, is a two-gang, four-position, rotary or wafer switch. Speaker/microphone 208 is operatively connected to first gang 210 of the switch.

Switch 206 comprises a system selection means that has a door answering position (actually, as explained below, two such positions designated in FIG. 5 as positions 3 and 4) and an auxiliary intercommunication position (designated as position 2 in FIG. 5). The switch is adapted to provide power selectively to inside door answering station 190 (as line switch 39 does in the embodiment of FIG. 1) or to first internal intercommunication system 192, depending upon which of its positions the switch is in.

When switch 206 is in its position 1, the speaker/microphone is not connected through gang 210 with either Channel 3 receiver or Channel 3' transmitter of first room-to-room intercommunication station 192, or with Channel 1 transmitter 186 or Channel 2 receiver 188 of inside door answering station 190. At such time, all return circuits for the means for delivering alternating electrical current to stations 190 and 192 are open, and no receiver or transmitter for any of the three sound transmitting channels at inside door answering station 190 and first internal intercommunication system 192 is operative.

When switch 206 is in its position 2, speaker/microphone 208 is connected in parallel to the Channel 3' receiver and the Channel 3 transmitter of first internal intercommunication station 192 through first gang 210 and lead 211. At the same time, wire 212 of line cord 196 is connected in parallel with the Channel 3' receiver and the Channel 3 transmitter, through second gang 214, wire 216, and lead 218.

With switch 206 in its position 2 as just described, either one of the Channel 3' receiver and the Channel 3 transmitter for first internal intercommunication station 192 can be turned on. Whether it is the Channel 3' receiver or the Channel 3 transmitter that is turned on will depend upon whether talk/listen switch 220 is in its normal spring-biased "listen" position or has been moved into its "talk" position.

Switch 220 is a single-pole double-throw switch that is, as just indicated, normally spring-biased into its "listen" position 221. In this position of the switch, the above described circuit from wire 212 of line cord 196 through gang 214 and wire 216 to lead 218 is extended, through side 222 of switch 220, to the Channel 3' receiver. As will be seen, in this mode the person at first room-to-room intercommunication station 192 can hear what is said at the second internal intercommunication station when the "push-to-talk" switch at the latter station is depressed.

When switch 220 is moved into its position 223, the circuit from wire 212 of line cord 196 to lead 218 is extended, through side 224 of the switch, to the Channel 3 transmitter. In this mode, the person at first internal intercommunication station 192 can speak to whoever is at second internal intercommunication station 106 when the "push-to-talk" switch at the latter station is in its normal spring-biased "listen" position.

It will be seen that in this embodiment switch 206 comprises means for selecting (1) which of the two intercommunication systems—door answering and room-to-room—is to be powered, and (2) in addition, which of the two modes of the answering station of the first intercommunication system—its listen mode and its talk mode—that station will be in. Switch 220 brings to this latter talk/listen selection means additional talk/listen selection means to select which of its two modes the first auxiliary, room-to-room intercommunication system will be in.

When the person at the inside door answering station wishes to hear whatever is said at the outside door, first gang 210 of switch 206 will be placed in its position 3, designated "Listen to Door" in FIG. 5. In this position of the switch, speaker/microphone 208 is connected with output lead 226 of Channel 2 receiver 188. At the same time, because second gang 214 of switch 206 is in its position 3, wire 212 of line cord 196 is connected (through wire 228) with input lead 230 of Channel 2 receiver 188. As will be seen, in this mode whatever is said at outside door calling station 20 will be transmitted to component 208 operating as a speaker.

When the person at the inside door answering station wishes to speak to the caller at the door, switch 206 is moved to its position 4, designated "Talk to Door" in FIG. 5. In this position of the switch, speaker/microphone 208 is connected with input lead 232 of Channel 1 transmitter 186. At the same time, because of the position of gang 214, wire 212 of line cord 196 is connected (through wire 234) with output lead 236 of Channel 1 transmitter 186. As will be seen, in this mode whatever is said at inside door answering station 190 will be transmitted to speaker 33 at outside door calling station 20.

To sum up, first gang 210 of switch 206 determines where speaker/microphone 208 will be connected—off in position 1, connected to the Channel 3/3' room-to-room intercommunication system in position 2, to Channel 2 receiver of the door answering system in position 3, and to Channel 1 transmitter of the door answering system in position 4.

Second gang 214 of switch 206 determines where A.C. power will go. In any given position of the switch, because the first and second gangs move together, power goes to the same module to which speaker/microphone 208 is operatively connected. In position 1, all power is off. When gang 214 of switch 206 is in position 2, the room-to-room intercom is powered. Position 3 of gang 214 powers Channel 2 receiver 188 of inside door answering station 190. Position 4 of gang 214 powers Channel 1 transmitter 186 of station 190.

Ordinarily switch 206 is left in the room-to-room position. In this way, a call from another station in the room-to-room intercommunication system will always be heard, since switch 220 is normally biased to its "listen" position.

When the door bell rings, the person at inside door answering station 190 moves switch 206 to its position 4, which is the position for talking to the door station. When the spring biased lever on switch 206 is released, switch 206 automatically moves back to position 3, which is the position for listening to the door station. When switch 206 is in this latter position, the person at the inside station can hear the reply from the person at the door.

After the conversation is completed, the person at the door answering station 190 should (as already indicated above) return switch 206 to its position 2, the room-to-room position. Thus, if someone wishes to call the first internal intercom station from elsewhere in the building, the call will be received.

Third Combination Door Answering And Internal Communication System

Figure 6:
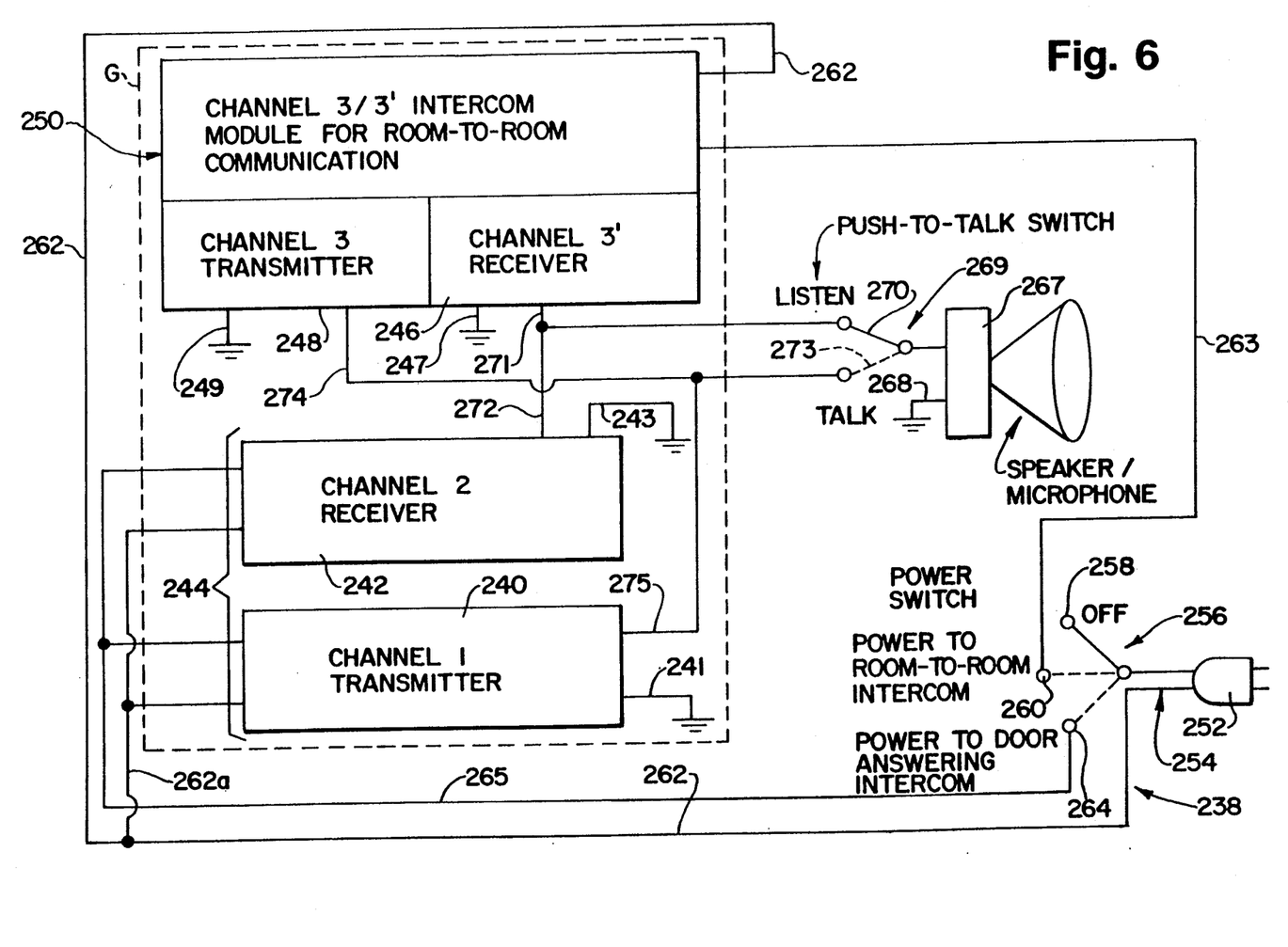
FIG. 6 is a block diagram of a portion of a third, preferred embodiment of such a combination system.

FIG. 6 is a block diagram of a portion 238 of a fifth embodiment of a wireless door answering intercommunication system according to this invention which, like the third and fourth embodiments described above, includes an auxiliary internal room-to-room intercommunication system in combination with the door answering system. The embodiment illustrated in this Figure is the preferred embodiment of the combination system.

Portion 238 of this embodiment of the invention that is shown in FIG. 6 includes Channel 1 transmitter 240 and Channel 2 receiver 242 for inside door answering station 244, and Channel 3' receiver 246 and Channel 3 transmitter 248 for first internal intercommunication station 250. The two stations 244 and 250, which together comprise combination station 238, are contained in the same housing G.

As explained below, Channel 3' receiver 246 and Channel 3 transmitter 248 operate on the same predetermined carrier frequency or frequency bands, but at different times. They may therefore be considered as parts of a channel designated as Channel 3/3'.

Channel 1 transmitter 240 has an input lead 241 connected to ground, and Channel 2 receiver 242 has an output lead 243 connected to ground. Similarly, Channel 3' receiver 246 has an output lead 247 connected to ground, and Channel 3 transmitter 248 has an input lead 249 connected to ground.

It will be understood that in its complete form this embodiment of the intercommunication system of the invention includes an outside door answering station such as station 20 already described above. It will also be understood that the combination system further includes one or more internal intercommunication stations such as station 106 described above or, if desired, one or more combination stations such as combination door answering and room-to-room intercom station 238 now being described.

Sound transmitting Channels 1, 2 and 3/3' of this combination system operate on separate carrier frequencies or frequency bands—for FM units, suitably about 200 kHz, 225 kHZ and 250 kHz for Channels 1, 2 and 3/3', respectively.

Power for the receivers and transmitters shown diagrammatically in FIG. 6 is made available when plug 252 of line cord 254 is inserted in one of the outlets of the power system of the building where the stations in question are located. The building's wiring that distributes A.C. power is also used, as in the embodiments of this invention described above, for the "carrier current transmission" that is utilized in this invention.

Power switch or system selection means 256 determines whether Channel 1 transmitter 240 and Channel 2 receiver 242 of inside door answering station 244, on the one hand, or Channel 3' receiver 246 and Channel 3 transmitter 248 of first auxiliary room-to-room intercommunication station 250, on the other hand, are operative. When switch 256 is in its "off" position 258, nothing is activated. When this switch is in its second position, only Channel 3/3' intercommunication module 250 for room-to-room communication is powered (through lines 262 and 263), and Channel 1 transmitter 240 and Channel 2 receiver 242 at inside door answering station 244 are not powered. Then, when the switch is in its third position 264, power is supplied (through lines 262, 262a and 265) to Channel 1 transmitter 240 and to Channel 2 receiver 242 at station 244, but not to Channel 3/3' module 250.

This third embodiment of a combination door answering system and a room-to-room intercommunication system includes speaker/microphone 267, which has a first lead 268 connected to ground. Speaker/microphone 267 is operatively connected through "push-to-talk" switch 269 both with inside door answering station 244 and with room-to-room intercommunication module 250.

When "push-to-talk" switch or talk/listen selection means 269 is in its listen position 270, speaker/microphone 267 is connected both with Channel 3' room-to-room receiver 246 (through its second output lead 271) and with Channel 2 door answering receiver 242 (through its second output lead 272), but only with those units. In this mode, component 267 acts as a speaker. As already explained, only one of these two receivers 242 and 246 is powered at any given time, depending upon the position of power switch 256 at that time.

When switch 269 is moved to its talk position 273, speaker/microphone 267 is connected both with Channel 3 room-to-room transmitter 248 (through its second input lead 274) and with Channel 1 door answering transmitter 240 (through its second input lead 275), but only with those units. In this mode, component 267 acts as a microphone. Again, only one of these two transmitters 240 and 248 is powered at any given time, as determined by the position of power switch 256 at that time.

As stated above, FIG. 6 illustrates a portion of a combination door answering system and room-to-room intercommunication system. The system of which combination station 238 is a part, like the other two combination systems to which FIGS. 4 and 5 relate, can be used to answer the door in the same way as the systems shown in FIGS. 1 and 2 can be used, and also makes it possible to talk to and listen to one or more room-to-room intercommunication stations located elsewhere.

When the embodiment of FIG. 6 is in use, power switch 256 is turned on and set to "room-to-room intercom" position 260. The same is done at any similar internal room-to-room units there may be in the house. When the door bell sounds, any person in the house can go to any combination station and answer the door by (1) switching power switch 256 to its "door answering intercom" position 264, (2) pushing "push-to-talk" switch 269 to its "talk" position 273, (3) talking to the visitor outside the door and (4) releasing the "push-to-talk" switch to hear the visitor's answer.

When this conversation ends, the power switch should be returned to the "room-to-room intercom" position. In this way, anytime a person in the house wants to reach another person in the house, the caller simply goes to the nearest station, operates the "push-to-talk" switch (such as switch 269 in FIG. 6 or switch 170 in FIG. 4) and calls for the wanted person. This call will heard on all inside stations, since all auxiliary stations are switched to their "room-to-room" position and all "push-to-talk" switches are in the "listen" position.

If desired, any other suitable switching arrangement besides those shown in FIGS. 4–6 may be used, so long as it is an arrangement that makes joint door answering and room-to-room intercommunication possible (as the three embodiments illustrated in those Figures do), with the person at the outside door calling station being able to communicate without having to manipulate a "push-to-talk" switch.

It should also be understood that the second room-to-room intercom station, such as station 106 in FIG. 4, may be replaced by another combination station such as stations 103/104. In fact, it seems likely that many homeowners would like all interior stations to be door answering stations as well as inside intercom stations.

Various embodiments of the wireless intercommunication system of this invention have been described above as installed in place and ready for use. Certain of the claims below define the system of the invention when in this installed condition. Other claims define the system in the form of first and second modules as sold by an equipment manufacturer, distributor or retailer, which modules will comprise the calling station and answering station, respectively, after they are installed in place.

While this invention has been described in connection with the best mode presently contemplated by the inventor for carrying out his invention, the preferred embodiments described and shown are for purposes of illustration only, and are not to be construed as constituting any limitation of the invention. Modifications will be obvious to those skilled in the art, and all modifications that do not depart from the spirit of the invention are intended to be included within the scope of the appended claims.

I claim:

1. A wireless intercommunication system that permits a person at a calling station at a predetermined location to use the system without operating a push-to-talk switch, which system is utilized with a conventional electrical power line that provides electrical power at a standard frequency at a plurality of outlets, one of which outlets is located in the vicinity of the predetermined calling station and one in the vicinity of an answering station, which wireless intercommunication system comprises:
- (a) a predetermined calling station, which includes:
  - (i) means for delivering alternating electrical current at a standard frequency to said predetermined calling station from said outlet in the vicinity of the calling station;
  - (ii) a radio frequency receiver whose input leads are connected across said means for delivering alternating electrical current, said receiver operating on a first predetermined carrier frequency or frequency band as a part of a first sound transmitting channel;
  - (iii) a loudspeaker operatively connected to the output of said radio frequency receiver for said first channel;
  - (iv) a radio frequency transmitter whose output leads are connected across said means for delivering alternating electrical current, said transmitter operating on a second, separate, predetermined carrier frequency or frequency band as a part of a second sound transmitting channel; and
  - (v) a microphone operatively connected to the input leads of said radio frequency transmitter for said second channel; and
- (b) an answering station, which includes:
  - (i) means for delivering alternating electrical current at a standard frequency to said answering station from said outlet in the vicinity of the answering station;
  - (ii) a radio frequency transmitter whose output leads are connected across said last mentioned means for delivering alternating electrical current, said transmitter operating on said first predetermined carrier frequency or frequency band as a part of said first sound transmitting channel, said transmitter having one input lead connected to ground;
  - (iii) a radio frequency receiver whose input leads are connected across said last mentioned means for delivering alternating electrical current, said receiver operating on said second, separate, predetermined carrier frequency or frequency band as a part of said second sound transmitting channel, said receiver having one output lead connected to ground;
  - (iv) a speaker/microphone adapted to operate as a microphone when operatively connected to said transmitter for said first channel and as a speaker when operatively connected to said receiver for said second channel, said speaker/microphone having one lead connected to ground; and
  - (v) talk/listen selection means which:
    has at least one talk position and at least one listen position,
    is normally biased from a talk position to a listen position to connect the second output lead of said receiver for the second channel to the second lead of said speaker/microphone, and
    when moved into a talk position by the person at said answering station, is adapted to connect the second input lead of the transmitter for the first channel to the second lead of said speaker/microphone,
    whereby the person at the predetermined calling station can communicate "hands-free" with the person at the answering station, since;

the receiver for the first channel and the transmitter for the second channel, both located at the predetermined calling station, are operative at all times, one or the other of the transmitter for the first channel and the receiver for the second channel, both located at the answering station, is selectively operative depending upon the position of the talk/listen selection means at the latter station, said talk/listen selection means, when in a normally biased listen condition, connects the speaker/microphone at said answering station to the output of the receiver for said second channel, so that any sound picked up by the microphone at the predetermined calling station will be converted by it into an electrical signal in the audio frequency range, which is then converted by the transmitter for the second channel into a radio frequency electrical signal that is carried by said conventional electrical power line to the answering station and converted there by the receiver for the second channel and the speaker/microphone into an audible sound, and the reverse is true when the talk/listen selection means is actuated by the person at the answering station to connect the speaker/microphone to the second input lead of the transmitter for the first channel.

2. The wireless intercommunication system of claim 1 in which the means for delivering alternating electrical current to said answering station includes means for rendering said alternating electrical current-delivering means at the answering station operative or inoperative, as selected by the person at the answering station.

3. The wireless intercommunication system of claim 2 in which:
- (a) said means for rendering the means for delivering alternating electrical current to the answering station operative or inoperative comprises a single-pole single-throw switch operatively connected with said alternating electrical current-delivering means at the answering station; and
- (b) said talk/listen selection means at the answering station is a single-pole double-throw switch.

4. The wireless intercommunication system of claim 2 in which said means for rendering the means for delivering alternating electrical current to said answering station operative or inoperative and said talk/listen selection means together comprise an off/push-to-talk switch that has:
- (a) an off position in which the off/push-to-talk switch is open and the transmitter and the receiver at said answering station are thereby rendered inoperative, the switch being selectively movable to said off position by a person at the answering station;
- (b) another position to which said off/push-to-talk switch is normally biased when it has not been placed by the person at the answering station in said off position, in which other position the second lead of the speaker/microphone at the answering station is connected to the second output lead of the receiver for the second channel; and
- (c) another position to which the person at the answering station can selectively push said off/push-to-talk switch, in which last mentioned position the second lead of the speaker/microphone at the answering station is connected to the second input lead of the transmitter for the first channel, whereby a person at said answering station can selectively place the station in the off condition, in the listen mode, or in the talk mode, as desired.

5. A first wireless intercommunication system according to claim 2 in combination with a second, auxiliary, wireless intercommunication system, the auxiliary system including first and second auxiliary intercommunication stations, the parties at both said auxiliary stations being required to operate a push-to-talk switch, said combination system including:

(a) system selection means operatively connected with said means for delivering alternating electrical current to the answering station of said first intercommunication system, said system selection means having at least one answering position and at least one auxiliary intercommunication position, and being adapted to provide power selectively to said answering station or to said first auxiliary intercommunication station depending upon which of its said positions the system selection means is in;

(b) a first auxiliary intercommunication station which comprises:

(i) a radio frequency transmitter whose output leads are connected, when said system selection means is in its auxiliary intercommunication position, across said means for delivering alternating electrical current to the answering station of said first intercommunication system, said transmitter operating on a third, separate, predetermined carrier frequency or frequency band as a part of a third sound transmitting channel, said transmitter having two input leads, the first of which is connected to ground; and (ii) a radio frequency receiver whose input leads are connected, when said system selection means is in its auxiliary intercommunication position, across said means for delivering alternating electrical current to the answering station of said first intercommunication system, said receiver operating on said third, separate, predetermined carrier frequency or frequency band as a part of said third sound transmitting channel, said receiver having two output leads, the first of which is connected to ground, said talk/listen selection means at the answering station of said first intercommunication system being additionally adapted:

(i) when in a talk position, to operatively connect said transmitter for said first auxiliary intercommunication station to said speaker/microphone located at said answering station; and (ii) when in a listen position, to operatively connect said receiver for said first auxiliary intercommunication station to said speaker/microphone located at said answering station; and (c) a second auxiliary intercommunication station which comprises:

(i) means for delivering alternating electrical current at a standard frequency to said second auxiliary intercommunication station from an outlet of said building power line in the vicinity of the station;

(ii) a radio frequency transmitter whose output leads are connected across said means for delivering alternating electrical current to said second auxiliary intercommunication station, said transmitter operating on said third, separate, predetermined carrier frequency or frequency band as a part of said third sound transmitting channel, said transmitter having one input lead connected to ground;

(iii) a radio frequency receiver whose input leads are connected across said means for delivering alternating electrical current to said second auxiliary intercommunication station, said receiver operating on said third, separate, predetermined carrier frequency or frequency band as a part of said third sound transmitting channel, said receiver having one output lead connected to ground;

(iv) a speaker/microphone adapted to operate as a microphone when operatively connected to the input of said last mentioned transmitter for said third channel and as a speaker when operatively connected to the output of said last mentioned receiver for the third channel, said speaker/microphone having one lead connected to ground; and (v) a push-to-talk switch which:

has a listen position and a talk position, is normally biased from its talk position to its listen position to connect the second output lead of said receiver for the third channel at said second auxiliary intercommunication station to the second lead of said last mentioned speaker/microphone, and when in its talk position, will connect the second input lead of said transmitter for the third channel at said second auxiliary intercommunication station to the second lead of said last mentioned speaker/microphone, whereby the above described combination system can be operated either as a wireless intercommunication system that permits a person at a predetermined calling station to use the system without operating a push-to-talk switch, or as an auxiliary intercommunication system, depending upon which position of said system selection means is selected.

6. The combination wireless intercommunication system of claim 5 in which said system selection means includes:

(a) a single-pole double-throw switch operatively connected between said electrical outlet in the vicinity of said answering station and either (i) the transmitter and receiver for the answering station of said first intercommunication system or (ii) the transmitter and receiver for said first auxiliary intercommunication station, depending upon which of its positions the system selection means is put in by the user of the system; and (b) an additional position for said talk/listen selection means at said answering station, which additional position is an off position in which the connection across said talk/listen selection means is open.

7. The combination wireless intercommunication system of claim 5 in which said system selection means and said talk/listen selection means at the answering station of said first intercommunication system together comprise:

(a) a two-gang, four-position switch in which:

(i) the first gang of the switch has one side operatively connected to said first mentioned speaker/microphone, and has:

a first position in which both of said wireless intercommunication systems are inoperative;

a second position in which said first mentioned speaker/microphone is operatively connected to the receiver and transmitter for said third channel at said first auxiliary intercommunication station;

a third position in which said first mentioned speaker/microphone is operatively connected to the receiver for the second channel at the answering station of said first intercommunication system; and a fourth position in which said first mentioned speaker/microphone is operatively connected to the transmitter for the first channel at said answering station; and (ii) the second gang of said switch has one side adapted to be operatively connected to said electrical outlet in the vicinity of the answering station of said first intercommunication system, and has:

a first position in which both of said wireless intercommunication systems are off;

a second position in which electrical power is supplied to the receiver and transmitter for the third channel at the first auxiliary intercommunication station;

a third position in which electrical power is supplied to the receiver for the second channel at the answering station of said first intercommunication system; and a fourth position in which electrical power is supplied to the transmitter for the first channel at said answering station; and (b) as one part of said talk/listen selection means, a single-pole double-throw switch that is operatively connected between the transmitter and receiver for the first auxiliary intercommunication station, on the one hand, and the second position of said second gang of said two-gang four-position switch, on the other.

8. The combination wireless intercommunication system of claim 5 in which:

(a) said system selection means has:

(i) a first position in which the answering station of said first intercommunication system and said first auxiliary intercommunication station are both off;

(ii) a second position in which power is supplied only to the transmitter and receiver for said first auxiliary intercommunication station; and (iii) a third position in which power is supplied only to the transmitter for the first channel and receiver for the second channel at the answering station for said first intercommunication system; and (b) said talk/listen selection means comprises a single-pole double-throw switch that has:

(i) a first position in which said speaker/microphone at the answering station of said first intercommunication system is operatively connected to the output of the receiver for the second channel at said answering station, and to the output of the receiver for the third channel at said first auxiliary intercommunication station; and (ii) a second position in which said speaker/microphone is operatively connected to the input of the transmitter for the first channel at the answering station of said first intercommunication station, and to the input of the transmitter for the third channel at the first auxiliary intercommunication station.

9. A wireless intercommunication system that when installed will permit a person at a calling station at a predetermined location to use the system without operating a push-to-talk switch, which system is to be utilized with a conventional electrical power line that provides electrical power at a standard frequency at a plurality of outlets, one of which outlets is located in the vicinity of the predetermined calling station and one in the vicinity of an answering station, which wireless intercommunication system comprises:

(a) a first module, whose components are arranged and adapted to act, when installed, as a predetermined calling station, which module includes:

(i) means for delivering alternating electrical current at a standard frequency to said predetermined calling station from said outlet in the vicinity of the calling station;

(ii) a radio frequency receiver whose input leads are connected across said means for delivering alternating electrical current, said receiver operating on a first predetermined carrier frequency or frequency band as a part of a first sound transmitting channel;

(iii) a loudspeaker operatively connected to the output of said radio frequency receiver for said first channel;

(iv) a radio frequency transmitter whose output leads are connected across said means for delivering alternating electrical current, said transmitter operating on a second, separate, predetermined carrier frequency or frequency band as a part of a second sound transmitting channel; and (v) a microphone operatively connected to the input leads of said radio frequency transmitter for said second channel; and (b) a second module, whose components are arranged and adapted to act, when installed, as an answering station, which module includes:

(i) means for delivering alternating electrical current at a standard frequency to said answering station from said outlet in the vicinity of the answering station;

(ii) a radio frequency transmitter whose output leads are connected across said last mentioned means for delivering alternating electrical current, said transmitter operating on said first predetermined carrier frequency or frequency band as a part of said first sound transmitting channel, said transmitter having one input lead connected to ground;

(iii) a radio frequency receiver whose input leads are connected across said last mentioned means for delivering alternating electrical current, said receiver operating on said second, separate, predetermined carrier frequency or frequency band as a part of said second sound transmitting channel, said receiver having one output lead connected to ground;

(iv) a speaker/microphone adapted to operate as a microphone when operatively connected to said transmitter for said first channel and as a speaker when operatively connected to said receiver for said second channel, said speaker/microphone having one lead connected to ground; and (v) talk/listen selection means which:

has at least one talk position and at least one listen position, is normally biased from a talk position to a listen position to connect the second output lead of said receiver from the second channel to the second lead of said speaker/microphone, and when moved into a talk position by the person at said answering station, is adapted to connect the second input lead of the transmitter for the first channel to the second lead of said speaker/microphone, whereby when the system is installed in place the person at the predetermined calling station can communicate "hands-free" with the person at the answering station, since the receiver for the first channel and the transmitter for the second channel, both of which are included in the module that comprises the predetermined calling station, are operative at all times, one or the other of the transmitter for the first channel and the receiver for the second channel, both of which are included in the module that comprises the answering station, is selectively operative depending upon the position of the talk/listen selection means at the latter station, said talk/listen selection means, when in a normally biased listen condition, connects the speaker/microphone at said answering station to the output of the receiver for said second channel, so that any sound picked up by the microphone at the predetermined calling station will be converted by it into an electrical signal in the audio frequency range, which is then converted by the transmitter for the second channel into a radio frequency electrical signal that is carried by said conventional electrical power line to the answering station and converted there by the receiver for the second channel and the speaker/microphone into an audible sound, and the reverse is true when the talk/listen selection means is actuated by the person at the answering station to connect the speaker/microphone to the second input lead of the transmitter for the first channel.

10. The wireless intercommunication system of claim 9 in which the means for delivering alternating electrical current to said answering station includes means for rendering said alternating electrical current-delivering means at the answering station operative or inoperative, as selected by the person at the answering station.

11. The wireless intercommunication system of claim 10 in which:
 (a) said means for rendering the means for delivering alternating electrical current to the answering station operative or inoperative comprises a single-pole single-throw switch operatively connected with said alternating electrical current-delivering means at the answering station; and
 (b) said talk/listen selection means at the answering station is a single-pole double-throw switch.

12. The wireless intercommunication system of claim 10 in which said means for rendering the means for delivering alternating electrical current to said answer station operative or inoperative and said talk/listen selection means together comprise an off/push-to-talk switch that has:
 (a) an off position in which the off/push-to-talk switch is open and the transmitter and the receiver at said answering station are thereby rendered inoperative, the off/push-to-talk switch being selectively movable to said off position by a person at the answering station;
 (b) another position to which said off/push-to-talk switch is normally biased when it has not been placed by the person at the answering station in said off position, in which other position the second lead of the speaker/microphone at the answering station is connected to the second output lead of the receiver for the second channel; and
 (c) another position to which the person at the answering station can selectively push said off/push-to-talk switch, in which last mentioned position the second lead of the speaker/microphone at the answering station is connected to the second input lead of the transmitter for the first channel,
whereby when the system is installed in place a person at said answering station can selectively place the station in the off condition, in the listen mode, or in the talk mode, as described.

* * * * *